(12) United States Patent
Hu et al.

(10) Patent No.: US 11,657,535 B2
(45) Date of Patent: May 23, 2023

(54) SYSTEM AND METHOD FOR OPTIMAL CAMERA CALIBRATION

(71) Applicant: NVIDIA Corporation, Santa Clara, CA (US)

(72) Inventors: Feng Hu, Santa Clara, CA (US);
Yuzhuo Ren, Sunnyvale, CA (US);
Niranjan Avadhanam, Saratoga, CA (US); Ankit Pashiney, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 59 days.

(21) Appl. No.: 16/653,959

(22) Filed: Oct. 15, 2019

(65) Prior Publication Data
US 2021/0110575 A1    Apr. 15, 2021

(51) Int. Cl.
*G06T 7/80* (2017.01)
*G06T 7/70* (2017.01)
*H04N 17/00* (2006.01)
*G06F 3/14* (2006.01)

(52) U.S. Cl.
CPC .............. *G06T 7/80* (2017.01); *G06F 3/14* (2013.01); *G06T 7/70* (2017.01); *H04N 17/002* (2013.01); *G06T 2207/30268* (2013.01)

(58) Field of Classification Search
CPC ... G06T 7/80; G06T 7/70; G06T 2207/30268; G06F 3/14; H04N 17/002
USPC .......................................................... 348/181
See application file for complete search history.

(56) References Cited

U.S. PATENT DOCUMENTS

| 10,339,721 | B1 * | 7/2019 | Dascola | G06T 7/80 |
| 2018/0150962 | A1 * | 5/2018 | Fletcher | G06T 7/35 |
| 2019/0096091 | A1 * | 3/2019 | Bao | G06T 7/11 |
| 2020/0104030 | A1 * | 4/2020 | Dedual | G06F 3/04815 |

* cited by examiner

*Primary Examiner* — John W Miller
*Assistant Examiner* — Omer Khalid
(74) *Attorney, Agent, or Firm* — Taylor English Duma L.L.P.

(57) ABSTRACT

Systems and methods for automatic camera calibration without using a robotic actuator or similar hardware. An electronic display screen projects an image of a simulated three-dimensional calibration pattern, such as a checkerboard, oriented in a particular pose. The camera captures an image of the calibration pattern that is displayed on the screen, and this image together with the transform of the simulated three-dimensional calibration pattern are used to calibrate the camera. Multiple different pictures of different poses are employed to determine the optimal set of poses that produces the lowest reprojection error. To aid in selecting different poses, i.e., spatial positions and orientations of the simulated three-dimensional calibration pattern, poses may be selected from only that portion of the camera's field of view which is expected to be typically used in operation of the camera.

20 Claims, 6 Drawing Sheets

SYSTEM AND METHOD FOR OPTIMAL CAMERA CALIBRATION

BACKGROUND

Embodiments of the disclosure relate generally to image sensor calibration. More specifically, embodiments of the disclosure relate to systems and methods for optimal camera calibration.

SUMMARY

Calibration procedures have been developed for automatic determination of camera intrinsic and extrinsic parameters. Such procedures have provided an automated way of estimating lens and image sensor parameters of cameras, which can then be used to correct for imperfections such as lens distortion, to more accurately measure the actual size of objects in images, to determine the location of the camera in a scene, and the like. However, current automatic camera calibration approaches still suffer from significant drawbacks. For example, current calibration procedures often utilize robotic actuators or other hardware to accurately position calibration patterns in different poses and/or locations relative to the camera to calibrate for a broader spectrum of inputs. Such hardware is expensive, and constant re-positioning for a full range of test poses and locations can require significant effort and training time to implement properly.

Accordingly, to overcome the limitations of current calibration procedures, systems and methods are described herein for an automated camera calibration process that employs a two-dimensional projection screen to project images of a virtual three-dimensional calibration pattern to a camera for calibration. A two-dimensional screen such as, for example and without limitation, an electronic tablet device, screen, monitor, or other display device is placed at a specified distance from the camera, where the device is programmed to display an image of a three-dimensional calibration pattern in various orientations and positions. The displayed poses are calculated from specified rotations and translations of a simulated calibration pattern. Thus, transforms between each displayed pose and the two-dimensional screen can be determined, as can the transform between the screen and camera. The calibration process uses these two transforms—along with corresponding captured images—to estimate the intrinsic and extrinsic parameters of the camera. Selection and display of various calibration patterns can be automated, a number of different sets of poses may be used, and the process may thus determine the optimal such pose set corresponding to the lowest reprojection error efficiently and with low overhead costs.

In one embodiment, a display screen or display device is set a specified distance from a camera. The two-dimensional display screen may then display a set of three-dimensional representations of an object, where each three-dimensional representation is generated by transforming a simulated three-dimensional object. The camera captures an image of the display screen and each three-dimensional representation it displays, and determines from this set of images the estimated intrinsic and extrinsic parameters of the camera as well as the reprojection error. In this manner, images of a number of sets of three-dimensional representations may be captured, with a reprojection error determined for each set. The lowest reprojection error may be selected, with the corresponding estimates of intrinsic parameters used as camera parameters.

As above, the spatial position of the virtual three-dimensional calibration pattern may be determined, as can the distance between screen and camera. Transforms between simulated calibration pattern and the screen it is projected on, and between this screen and the camera, can thus be calculated. These are used to determine the overall transform between simulated pattern and camera, which in turn may be used to determine the reprojection error and camera intrinsic parameters for each image set.

The process may use any poses of the virtual three-dimensional calibration pattern to calculate camera parameters and reprojection error. That is, the simulated calibration pattern may be positioned and oriented anywhere in space that is detectable by the camera. This results in an extremely large number of potential poses that may be used in camera calibration. To reduce this number, the poses may be limited to those within some determined portion of the camera's field of view. In particular, poses may be limited to those within the expected or intended field of view of the camera when used in its particular application. For example, when the camera is known to be a camera for use inside the cabin of a vehicle, such as a camera for monitoring a driver's asleep/awake state, it is expected to capture images of objects that are typically sitting in the driver's seat, a known distance from the camera. Thus, the focal length of the camera can be estimated to correspond to the known distance between the camera position in cabin and the driver's seat. Poses of the virtual three-dimensional calibration pattern can thus be limited to those that are within some range constrained by the focal length. Thus, poses may be limited to those within some predetermined portion of the camera's field of view that is known or expected to be of interest.

It is noted that any pattern, object, or graphical fiducial may be used as the virtual three-dimensional calibration pattern. The calibration pattern may thus be any pattern or patterned object, such as a chessboard or AprilTag, any planar or three-dimensional pattern, irregular or textured object, or the like.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for carrying out automatic camera calibration without using a robotic actuator or similar hardware, or laborious and time-consuming manual repositioning of calibration devices. An electronic display screen projects an image of a simulated three-dimensional calibration pattern, such as a checkerboard, oriented in a particular pose. The camera captures an image of the calibration pattern that is displayed on the screen, and this image together with the transform of the simulated three-dimensional calibration pattern are used to calibrate the camera. Multiple different pictures of different poses are employed to determine the optimal set of poses that produces the lowest reprojection error. To aid in selecting different poses (i.e., spatial positions and orientations of the simulated three-dimensional calibration pattern), poses may be selected from only that portion of the camera's field of view which is expected to be typically used in operation of the camera.

Figure 1:
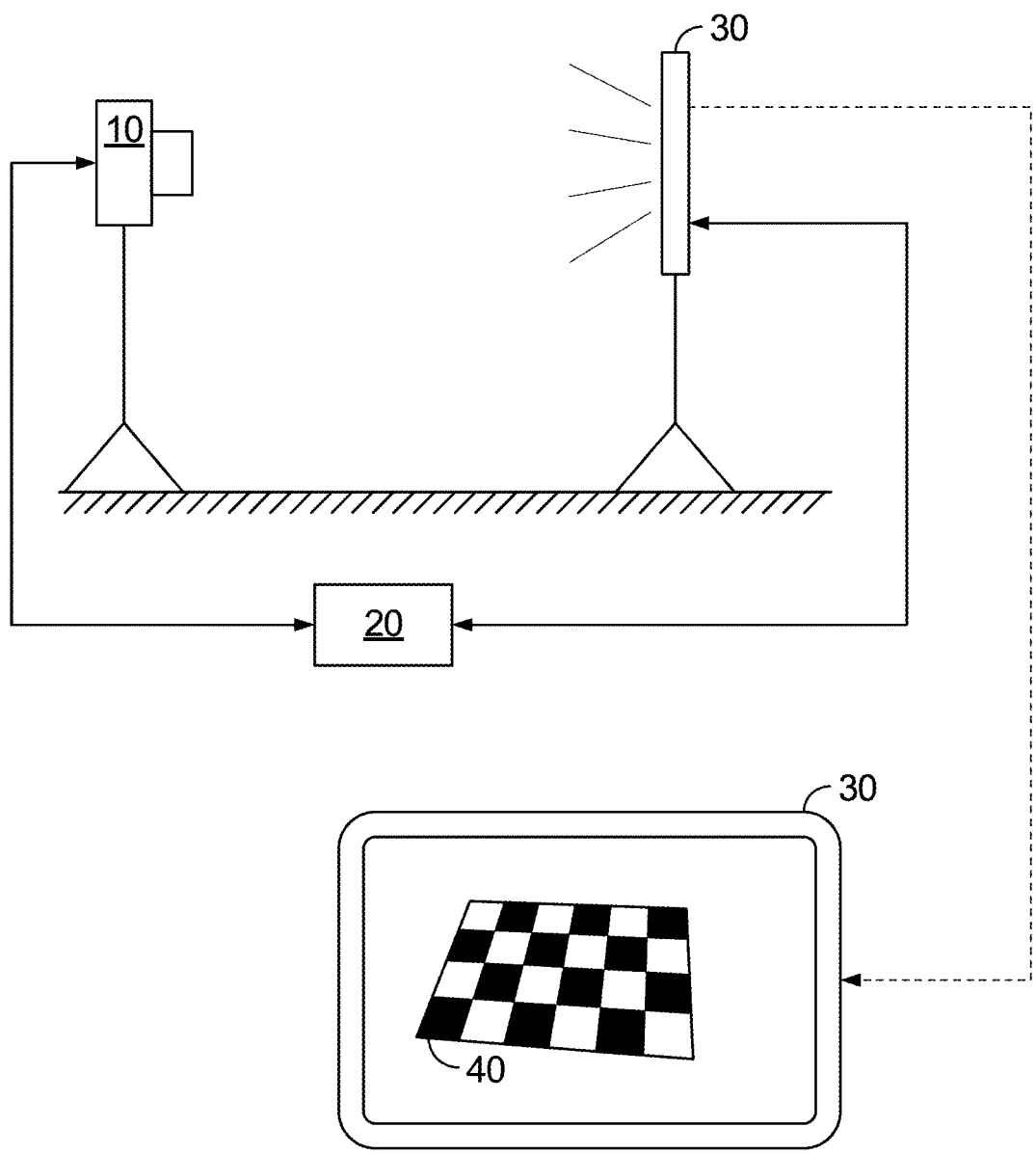
FIG. 1 illustrates operation of an automatic camera calibration system in accordance with embodiments of the disclosure.

FIG. 1 illustrates operation of an automatic camera calibration system in accordance with embodiments of the disclosure. Here, a camera 10 is calibrated using a computing device 20 with images displayed by an image projection device 30. The image projection device 30 projects images of a simulated calibration pattern in multiple two-dimensional representations that simulate the appearance of a three-dimensional object (such as a graphical fiducial) at various locations and according to various poses or orientations relative to the position of the camera, and the camera 10 captures an image of each representation. The computing device 20 stores the transform between the camera 10 and projection device 30, and receives the transform between the image projected by the projection device 30 and its corresponding simulated three-dimensional calibration pattern in virtual space. The computing device 20 can then compute the reprojection error of each image and intrinsic parameters of the camera 10.

The system of FIG. 1 utilizes images of different poses of a simulated calibration pattern displayed by image projection device 30, rather than a physical calibration pattern that is moved into different poses by a human technician and/or a robotic arm or other mechanical actuator. Accordingly, embodiments of the disclosure eliminate the need for an expensive robotic mechanism or actuator, reducing the expense of camera calibration. More specifically, conventional calibration processes would use a robotic arm, for example, to physically manipulate a pattern such as a checkerboard into various orientations at various distances from camera 10. Camera 10 would then capture an image of each such checkerboard pose, with reprojection error and/or camera 10 intrinsic parameters being determined from images of multiple different poses. In contrast, as shown in the lower portion of FIG. 1, image projection device 30 displays a simulated checkerboard 40 as it would look when placed in the above various orientations and distances from camera 10. The camera 10 captures images of the three-dimensional simulated checkerboard 40 poses as displayed on the two-dimensional screen of device 30, thus capturing a series of images that, to the camera 10, appear the same as if a real checkerboard were placed in those same orientations and moved to the same distances from camera 10. Reprojection error and camera 10 intrinsic parameters can thus be calculated from these simulated checkerboard 40 poses in the same manner as actual physical checkerboard patterns controlled by robotic arms or other physical hardware.

Figure 2:
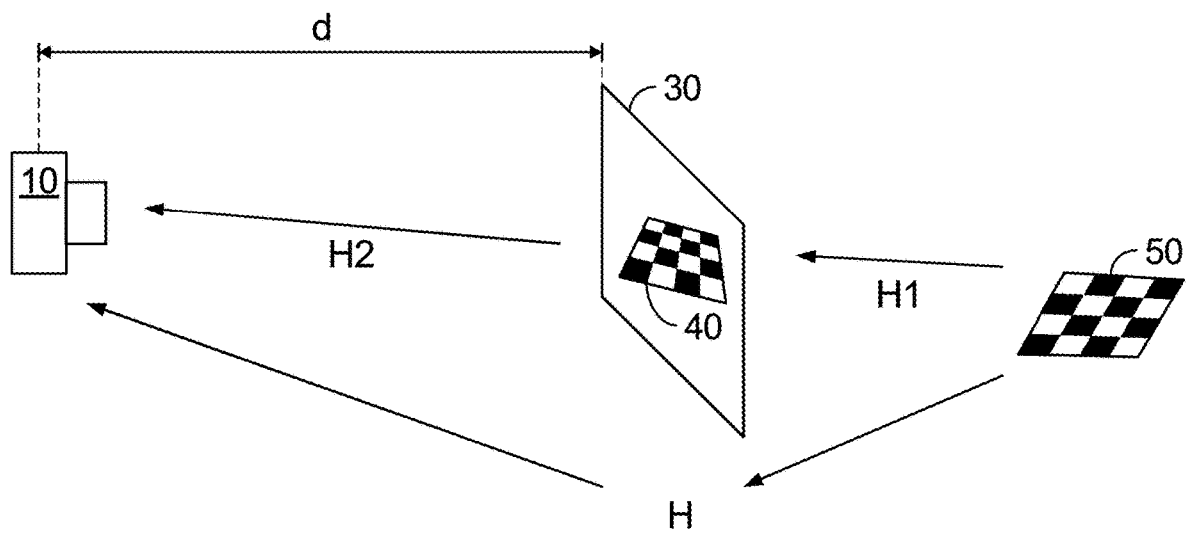
FIG. 2 conceptually illustrates operation of the automatic camera calibration system of FIG. 1.

FIG. 2 conceptually illustrates operation of the automatic camera calibration system of FIG. 1. Camera calibration processes involve a first transform transforming calibration pattern points in a world or global coordinate system $\{U, V, W\}$ into calibration pattern points in a camera coordinate system $\{x, y, z\}$, where the camera coordinate system is located on the camera 10. Next, a second transform transforms the calibration pattern points in $\{x, y, z\}$ into points in an image coordinate system $\{u, v\}$ which is the coordinate system of the two-dimensional image captured by the camera 10. The transformation from world coordinate system to camera coordinate system can be expressed as:

$$\begin{bmatrix} X \\ Y \\ Z \\ 1 \end{bmatrix} = H \begin{bmatrix} U \\ V \\ W \\ 1 \end{bmatrix}$$

where $$H = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix} \begin{bmatrix} 1 & 0 & 0 & -c_x \\ 0 & 1 & 0 & -c_y \\ 0 & 0 & 1 & -c_z \\ 0 & 0 & 0 & 1 \end{bmatrix}$$

and where the c and r values are translation and rotation values necessary to align the coordinate origins of the world coordinate and camera coordinate systems. As can be seen from FIG. 2, H=H1*H2, and therefore H1=H*H2$^{-1}$. H2 can be determined from the known distance d between camera 10 and apparent pose of the simulated checkerboard 40, and H1 is known from the calculations carried out by converting the particular pose of virtual checkerboard 50 into simulated checkerboard 40 as projected on display device 30. In other words, H1 represents the geometric relationship between points on virtual checkerboard 50 and the corresponding points on simulated checkerboard 40. This transformation is determined in known manner.

More specifically, a pose (location and orientation in world coordinates) of virtual checkerboard 50 is selected, the transform from (virtual) world coordinates to display 30 coordinates is calculated, and the corresponding simulated checkerboard 40 is displayed. The calculation and display of a three-dimensional simulated checkerboard 40 from a selected pose of a three-dimensional virtual checkerboard 50, and its display on a two-dimensional screen of display 30, is known and may be accomplished in any manner. Similarly, the calculation of corresponding transform H1 is known and may be accomplished in any manner.

Once H is determined from H1 and H2, camera 10 captures an image of the displayed simulated checkerboard 40. The coordinates (u, v) of the checkerboard 40 in the captured two-dimensional image can then be determined from the image, and values of the intrinsic parameters of camera 10 can be found from:

$$x' = \frac{X}{Z}$$

$$y' = \frac{Y}{Z}$$

$$x'' = x' \frac{1 + k_1 r^2 + k_2 r^4 + k_3 r^6}{1 + k_4 r^2 + k_5 r^4 + k_6 r^6} + 2p_1 x' y' + p_2(r^2 + 2x'^2)$$

$$y'' = y' \frac{1 + k_1 r^2 + k_2 r^4 + k_3 r^6}{1 + k_4 r^2 + k_5 r^4 + k_6 r^6} + p_1(r^2 + 2y'^2) + p_2 x' y'$$

where $$r^2 = x'^2 + y'^2$$

-continued $$u = f_x * x'' + c_x$$

$$v = f_y * y'' + c_y$$

Here, $k_1$-$k_6$ are radial distortion coefficients, $p_1$ and $p_2$ are tangential distortion coefficients, $f_x$ and $f_y$ are the focal length, and $c_x$ and $c_y$ are the principal point. In this manner, intrinsic parameters can be calculated. Reprojection error can also be determined in a known manner from the captured images.

Figure 3:
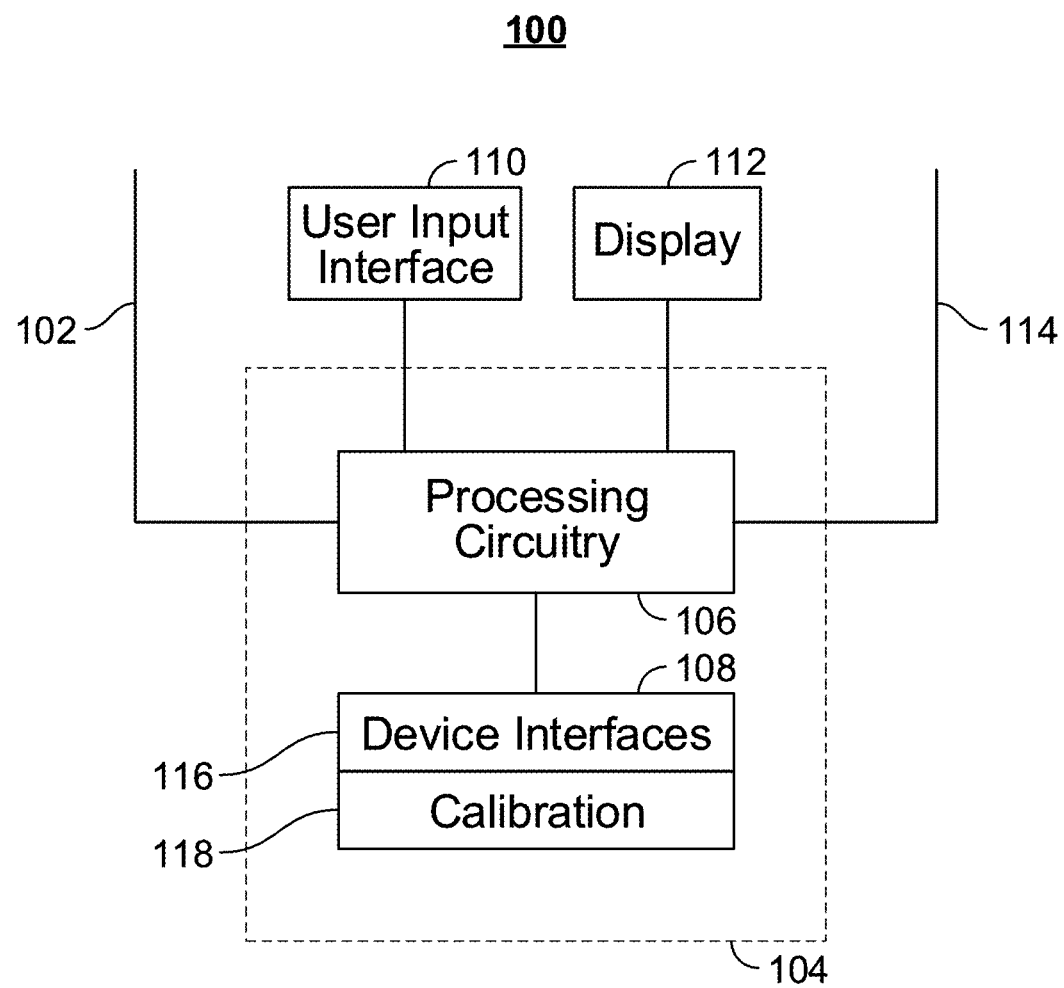
FIG. 3 is a generalized embodiment of an illustrative electronic computing device constructed for use according to embodiments of the disclosure.

FIG. 3 is a generalized embodiment of an illustrative electronic computing device constructed for use according to embodiments of the disclosure. Here, computing device 100 is a more detailed representation of computing device 20, and may be any device capable of generating different poses of a virtual calibration pattern and/or calculating corresponding reprojection error and camera intrinsic calibration parameters. For example, computing device 100 may be a laptop computer, tablet computer, server computer, or the like. FIG. 3 shows a generalized embodiment of an illustrative computing device 100 that may serve as a computing device 20. User equipment device 100 may receive data via input/output (hereinafter "I/O") path 102. I/O path 102 may provide data (e.g., image data from camera 10, commands to display device 30, and the like) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths but are shown as a single path in FIG. 3 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel® Core™ processors) or multiple different processors (e.g., an Intel® Core™ processor and an Intel® Nervana™ processor). Any type and structure of processing circuitry may be employed. For example, processing circuitry 106 may include a multi-core processor, a multi-core processor structured as a graphics or computation pipeline for carrying out operations in parallel, a neuromorphic processor, any other parallel processor or graphics processor, or the like. In at least one embodiment, processing circuitry 106 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor or graphics processor, for example.

In some embodiments, control circuitry 104 executes instructions for calculating reprojection error and camera intrinsic calibration parameters from captured images, where these instructions may be part of an application program running on an operating system. In at least one embodiment, computing device 100 may execute a version of the WINDOWS operating system available from Microsoft Corporation of Redmond, Wash., although other operating systems (UNIX and Linux for example), embedded software, and/or graphical user interfaces may also be used.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage may be used to supplement storage 108 or instead of storage 108.

Storage 108 may also store instructions or code for the above described operating system and any number of application programs to be executed by the operating system. In operation, processing circuitry 106 retrieves and executes the instructions stored in storage 108, to run both the operating system and any application programs started by the user.

Storage 108 is a memory that stores a number of programs for execution by processing circuitry 106. In particular, storage 108 may store a number of device interfaces 116, and calibration module 118. The device interfaces 116 are interface programs for handling the exchange of commands and data with the camera 10 and display device 30, and calibration module 118 includes code for carrying out the camera calibration processes described herein.

A user may send instructions to control circuitry 104 using user input interface 110. User input interface 110 may be any suitable user interface, such as a remote control, mouse, trackball, keypad, keyboard, touch screen, touchpad, stylus input, joystick, voice recognition interface, or other user input interfaces. Display 112 may be provided as a stand-alone device or integrated with other elements of user equipment device 100. For example, display 112 may be a touchscreen or touch-sensitive display. In such circumstances, user input interface 310 may be integrated with or combined with display 112. Display 112 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 112. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 104. The video card may be integrated with the control circuitry 104.

The computing device 100, i.e., device 20, may be a freestanding device as shown in FIG. 1. However, embodiments of the disclosure are not limited to this configuration, and contemplate other implementations of computing device 100. For example, computing device 100 may be a local device in wired or wireless communication with camera 10 and display device 30, or may be a remote computing device in communication with camera 10 and display device 30 via an electronic communications network such as the public Internet. The functionality of device 100 may also be incorporated into display device 30, so that device 30 both determines pose sets and processes resulting images to determine corresponding reprojection errors and camera intrinsic calibration parameters.

Figure 4:
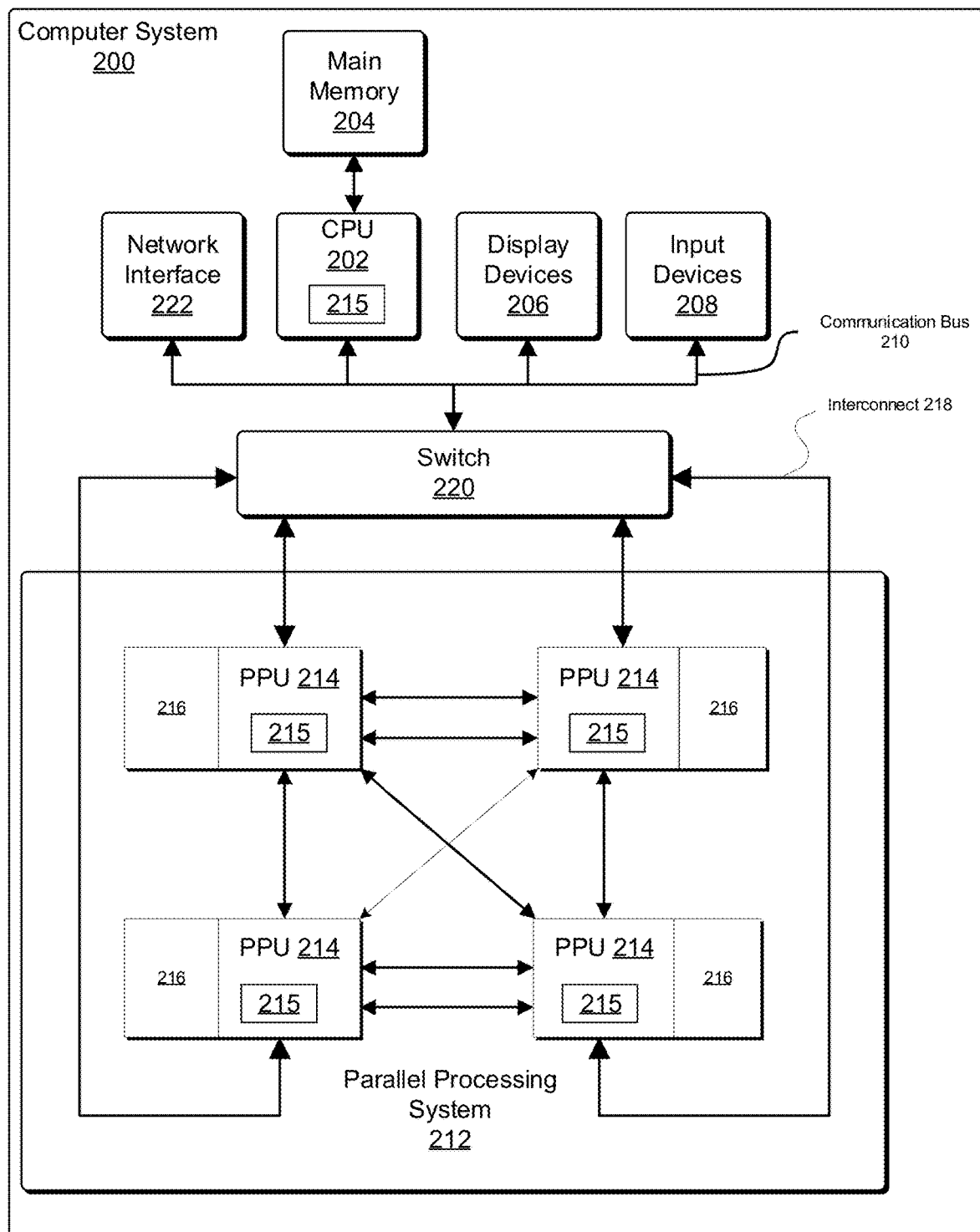
FIG. 4 is a generalized embodiment of an illustrative electronic display device constructed for use according to embodiments of the disclosure.

Display device 30 may be any electronic computing device capable of calculating and displaying various poses of a three-dimensional object and displaying the three-dimensional poses on a two-dimensional display. For example, display device 30 may be a desktop computer, a tablet computer, a server in electronic communication with a display panel, a computing device in electronic communication with a projector, or a smartphone. Furthermore, the display device 30 may have any configuration or architecture that allows it to generate and display poses of a three-dimensional calibration pattern. FIG. 4 illustrates one such configuration, in which display device 30 is shown as a computer system 200 that is constructed with a parallel processing architecture for parallel processing of pose calculation operations. In at least one embodiment, computer system 200 comprises, without limitation, at least one central processing unit ("CPU") 402 that is connected to a communication bus 210 implemented using any suitable protocol, such as PCI ("Peripheral Component Interconnect"), peripheral component interconnect express ("PCI-Express"), AGP ("Accelerated Graphics Port"), Hyper-Transport, or any other bus or point-to-point communication protocol(s). In at least one embodiment, computer system 200 includes, without limitation, a main memory 204 which may be any storage device, and control circuitry or logic (e.g., implemented as hardware, software, or a combination thereof). Data are stored in main memory 204 which may take the form of random access memory ("RAM"). In at least one embodiment, a network interface subsystem ("network interface") 222 provides an interface to other computing devices and networks for receiving data from and transmitting data to other systems from computer system 200. Logic 215 is used to perform computational operations associated with one or more embodiments, and may be any processing circuitry. In particular, logic 215 may include, without limitation, code and/or data storage to store input/output data, and/or other parameters for carrying out any computational operations. Logic 215 may also include or be coupled to code and/or data storage to store code or other software to control timing and/or order of operations. Logic 215 may further include integer and/or floating point units (collectively, arithmetic logic units or ALUs) for carrying out operations on retrieved data as specified by stored code. In at least one embodiment, any portion of code and/or data storage may be included with other on-chip or off-chip data storage, including a processor's L1, L2, or L3 cache or system memory.

In at least one embodiment, parallel processing system 212 includes, without limitation, a plurality of parallel processing units ("PPUs") 214 and associated memories 216. These PPUs 214 may be connected to a host processor or other peripheral devices via an interconnect 218 and a switch 220 or multiplexer. In at least one embodiment, parallel processing system 212 distributes computational tasks across PPUs 214 which can be parallelizable—for example, as part of distribution of computational tasks across multiple graphics processing unit ("GPU") thread blocks. Memory may be shared and accessible (e.g., for read and/or write access) across some or all of PPUs 214, although such shared memory may incur performance penalties relative to use of local memory and registers resident to a PPU 214. In at least one embodiment, operation of PPUs 214 is synchronized through use of a command such as_syncthreads( ), wherein all threads in a block (e.g., executed across multiple PPUs 214) are to reach a certain point of execution of code before proceeding.

Computer system 200 includes, without limitation, input devices 208, parallel processing system 212, and display devices 206 which can be implemented using a conventional cathode ray tube ("CRT"), liquid crystal display ("LCD"), light emitting diode ("LED"), plasma display, or other suitable display technologies. In at least one embodiment, user input is received from input devices 208 such as a keyboard, mouse, touchpad, microphone, and more. In at least one embodiment, each of the foregoing modules can be situated on a single semiconductor platform to form a processing system. It is noted that computer system 200 may have any other architecture besides the above described parallel processing architecture, so long as it is capable of generating and rendering poses of a three-dimensional calibration pattern and determining transforms therefor.

Figure 5:
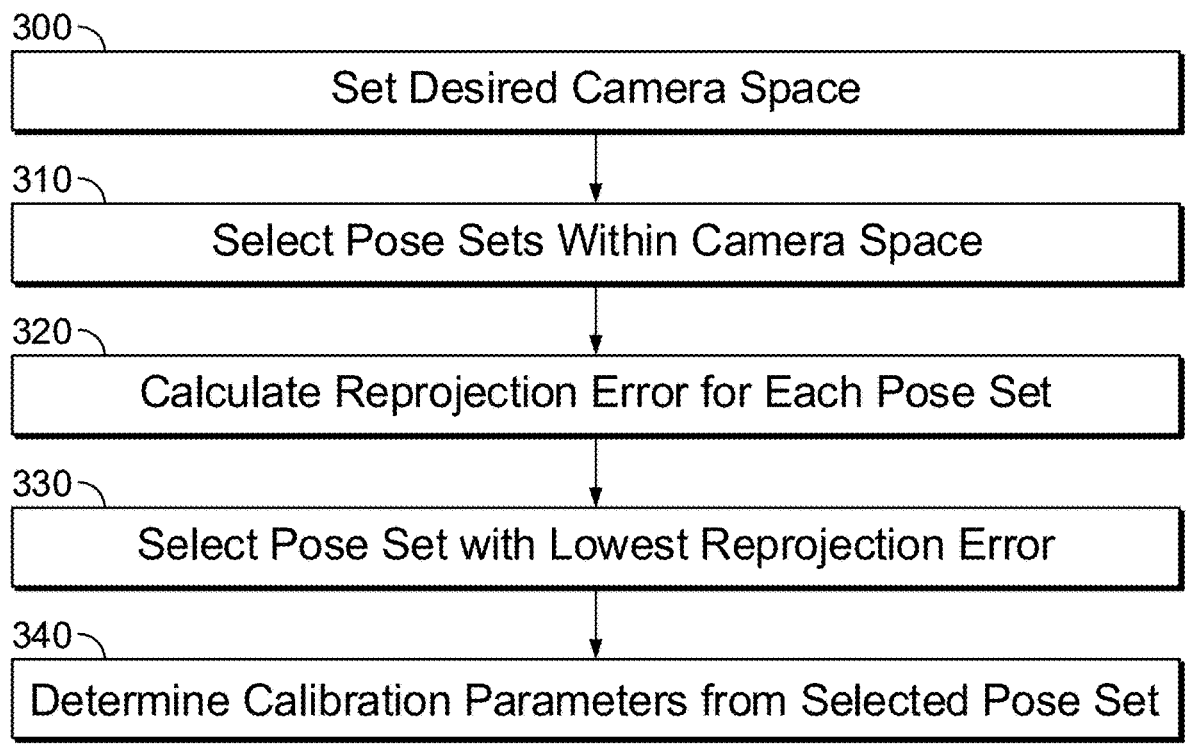
FIG. 5 is a flowchart illustrating process steps for selecting an optimal pose set and calibration parameters in accordance with embodiments of the disclosure.

FIG. 5 is a flowchart illustrating process steps for selecting an optimal pose set and calibration parameters in accordance with embodiments of the disclosure. Conventionally, a large number of calibration pattern poses can potentially fit within the field of view of a typical camera. It can thus be difficult to select a reasonable number of representative poses for camera calibration. To narrow the number of potential poses from which to select, the desired camera space is first determined (Step 300). In some embodiments, the camera space can be set as the spatial area or volume in which subjects of camera 10 are typically expected to be. For example, certain camera applications employ a known field of view that often does not vary. One such example is a vehicle cabin camera which is intended to photograph the driver or a passenger to determine, for instance, whether the driver has fallen asleep, and to generate an alert to wake the driver or take other corrective action. Such a camera is commonly located in a fixed position within the vehicle, and the subject, i.e., the driver or other passenger, is known to be typically located within a known space relative to the camera, e.g., in or near his or her seat. The camera would thus be expected to only capture images within, for instance, a spatial volume of known dimensions, centered at a point located at a predetermined distance from the camera (e.g., a point located at a distance from the camera equal to the distance between the camera and a point on or near the driver's seat). Embodiments of the disclosure contemplate any spatial volume shaped in any manner and having any dimensions and location within the camera field of view.

A number of poses of the simulated calibration pattern are then selected, where these poses are each located within the selected camera space (Step 310). That is, the spatial volume selected in Step 300 is a subset of the camera's field of view, and a number of calibration pattern poses are picked which each lie within this spatial volume. Any number of poses may be chosen. In some embodiments, a number of pose sets are selected, where each pose set contains any number of different poses each lying within the spatial volume.

Poses may be selected from within this spatial volume in any manner. As one example, each set may contain a predetermined number of poses selected randomly from within the spatial volume. This predetermined number may be any value, e.g., 20, although any number is contemplated. As another example, poses may be selected according to any predetermined heuristic, such as by selecting a predetermined number of poses located at regular intervals across both the spatial volume and the space of possible orientations. Another such heuristic may choose a selection of poses weighted toward the geometric center of the spatial volume. These and any other heuristic are contemplated.

Once pose sets are selected, the various poses of each pose set are then displayed on the display device 30 and captured by camera 10. The reprojection error for each pose set is then determined from the captured images for each pose set (Step 320). Reprojection error for a set of images is determined in known manner according to the distances between common keypoints of each pose in the set, and the respective points reprojected from these common keypoints.

Once reprojection error is determined for each pose set, the pose set with the lowest associated reprojection error is selected (Step 330), and the calibration parameters are determined from this selected pose set according to the camera intrinsic parameter expressions given above (Step 340).

The process of FIG. 5 thus provides an improved way of determining accurate intrinsic calibration parameters of a camera. The space of possible calibration pattern poses is narrowed according to the expected application of the camera, and pose sets are selected from within this narrowed space. Representations of these pose sets are then projected from a display screen set at a predetermined distance from the camera 10, and the camera 10 captures images of each pose of each pose set. Reprojection errors of each pose set are then determined from the captured images, and the pose set with the lowest reprojection error is used to determine the intrinsic calibration parameters of camera 10. In this manner, embodiments of the disclosure facilitate more rapid selection of pose sets, allowing the process to more quickly and accurately calibrate the camera 10 for the particular application it is intended.

Figure 6:
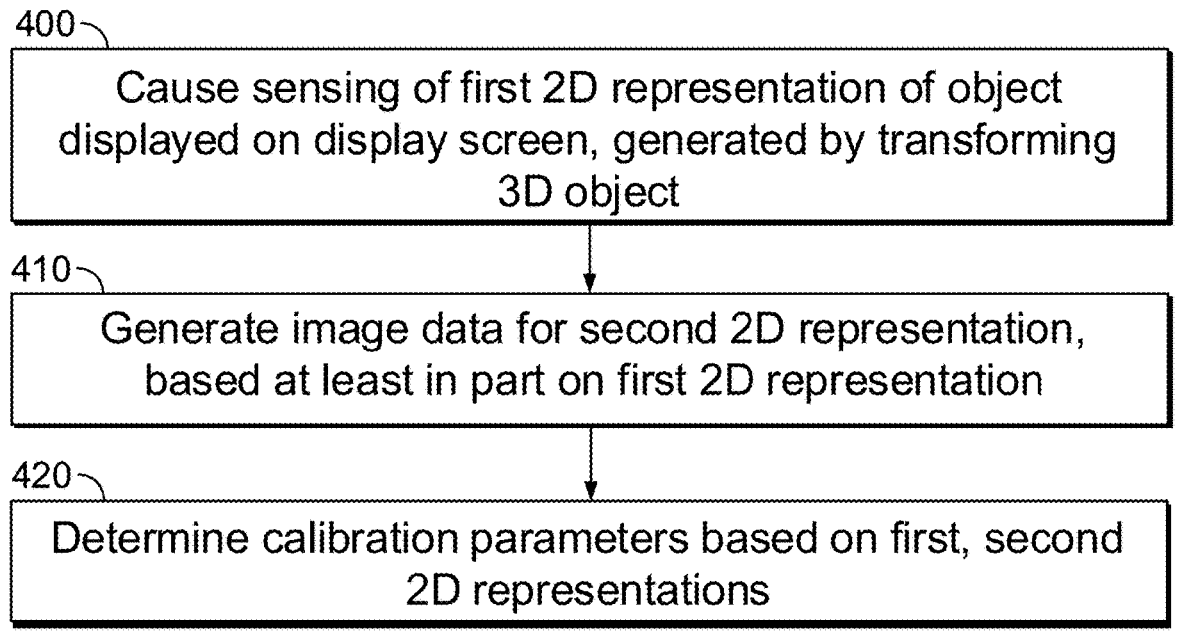
FIG. 6 is a flowchart illustrating process steps for selecting calibration parameters in accordance with further embodiments of the disclosure.

FIG. 6 is a flowchart illustrating process steps for selecting calibration parameters in accordance with further embodiments of the disclosure. The process of FIG. 6 further illustrates the conversion of a three-dimensional virtual object into a displayed image that is captured by camera 10. Here, a three-dimensional virtual object such as a virtual checkerboard 50 is transformed into a two-dimensional image displayed on the display panel of display device 30, as shown in FIG. 2. As above, the displayed image is a two-dimensional image oriented as the three-dimensional virtual checkerboard 50 would appear if projected onto the two-dimensional surface of display device 30. That is, computing device 20 directs camera 10 to detect, or capture an image of, a first two-dimensional representation of the object, in this case a checkerboard displayed on display device 30, where this two-dimensional representation is an image of a three-dimensional object as displayed on a two-dimensional screen (Step 400). The image captured by camera 10 is made up of image data, e.g., pixel values, and can be considered a second two-dimensional representation, i.e., the image displayed on display device 30 as perceived by camera 10. Thus, the camera 10 generates image data for a second two-dimensional representation of checkerboard 50, i.e., the checkerboard as perceived by the two-dimensional array of light sensors of camera 10, which is based on the first two-dimensional representation (Step 410). Calibration parameters can then be determined based on the first and second two-dimensional representations, as above (Step 420). More specifically, transforms H1 and H2 are determined from the pose of checkerboard 50 relative to display screen 30, and distance d. Camera intrinsic calibration parameters are then determined from the captured image, H1, and H2, using the relationships described above.

Figure 7:
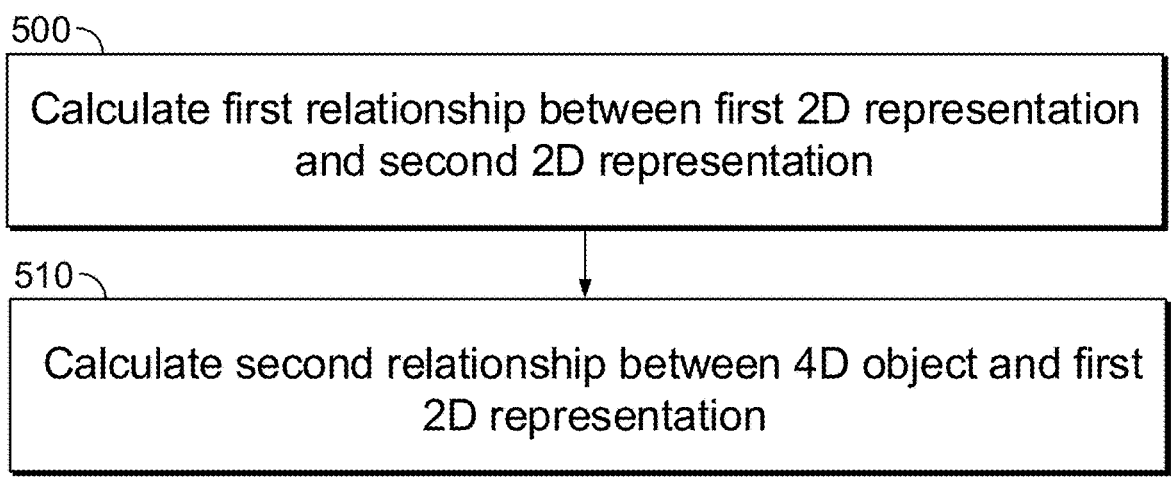
FIG. 7 is a flowchart illustrating further details of certain process steps of FIG. 6.

FIG. 7 is a flowchart illustrating further details of Step 420 of FIG. 6. Processor 20 calculates a second relationship, transform H1, between the object as displayed on the display device 30 and the object as perceived by camera 10, i.e., between the first two-dimensional representation and the second two-dimensional representation (Step 500). In determining the checkerboard 40 image from virtual checkerboard 50, display device 30 also calculates a second relationship, transform H2, between the virtual checkerboard 50 or virtual three-dimensional object, and the first two-dimensional representation (Step 510). Camera intrinsic calibration parameters are then determined using these relationships or transforms, as above.

One of ordinary skill in the art will observe that pose selection and reprojection error/calibration parameter calculation may be performed on any combination of devices 20 and 30. In particular, embodiments of the disclosure describe computing device 20 as being configured to perform calibration and reprojection error calculations, while display device 30 is configured to calculate poses of the virtual calibration object for display. These calculations may be divided among devices 20 and 30 in any other manner, however. For example, device 20 may also determine the poses of the virtual calibration object and transmit them for display to device 30. Here, display device 30 merely displays the poses it receives from computing device 20.

It can also be observed that the control circuitry of display device 30 is shown as including parallel processing circuitry, while the control circuitry of computing device 20 is not. Embodiments of the disclosure are not limited to this configuration however, and contemplate any type of circuitry, parallel or otherwise, for use in either of devices 20 and 30, and for use in carrying out calibration and reprojection error calculations or pose determination and/or display calculations. Both computing device 20 and display device 30 may be configured with any manner of control circuitry sufficient to collectively carry out processes of embodiments of the disclosure.

Embodiments of the disclosure also contemplate pose determination at any time. for example, while poses may be determined during the calibration process, they may also be determined ahead of time and simply retrieved for display when desired. Furthermore, optimal poses once determined may be stored in any memory for use in calibrating other cameras besides camera 10. For instance, an optimal pose set as determined by processes of the disclosure may be stored for retrieval by an application program residing on or executed by any computing device. In this manner, optimal pose sets may be retrieved and displayed by any computing device, to facilitate more rapid camera calibration.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any poses, of any number, may be selected for camera calibration, so long as they are perceptible as virtual or simulated three-dimensional objects projected from a two-dimensional display screen. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
causing to be sensed, using a sensor of a camera, a first two-dimensional representation of an object displayed on a display screen, wherein the first two-dimensional representation is generated by transforming the object in a virtual three-dimensional space to orient the object in a particular pose with respect to the camera and simulating the object having the particular pose within a predetermined portion of a field of view of the camera;
generating, using the sensor of the camera, image data representing an image depicting a second two-dimensional representation of the object corresponding to the first two-dimensional representation of the object;
determining a relationship between the first two-dimensional representation of the object displayed on the display screen and the second two-dimensional representation of the object as depicted by the image; and
determining one or more calibration parameters based at least on the relationship.

2. The method of claim 1, further comprising calculating a second relationship between the object in the virtual three-dimensional space and the first two-dimensional representation of the object, wherein the determining the one or more calibration parameters is further based at least on the second relationship.

3. The method of claim 1, further comprising:
causing to be sensed, from the display screen, a third two-dimensional representation of the object;
generating second image data representing a second image depicting a fourth two-dimensional representation of the object corresponding to the third two-dimensional representation of the object; and
determining a reprojection error for the fourth two-dimensional representation of the object,
wherein the determining the one or more calibration parameters is further based at least on the reprojection error.

4. The method of claim 1, further comprising sampling poses of the object to determine an orientation of the object, the poses including the particular pose.

5. The method of claim 1, wherein the predetermined portion of the field of view of the camera comprises a point positioned at a distance from the camera corresponding to a focal length of the camera.

6. The method of claim 1, wherein the predetermined portion of the field of view corresponds to a space occupied by an occupant of a vehicle in which the camera is positioned.

7. The method of claim 1, wherein the object comprises a patterned object.

8. A system comprising:
control circuitry configured to:
sample poses of an object to determine an orientation of the object, the poses including at least a pose;
cause to be sensed, using a sensor of a camera, a first two-dimensional representation of the object displayed on a display screen, wherein the first two-dimensional representation is generated by transforming the object in a virtual three-dimensional space to orient the object in the pose with respect to the camera and simulating the object having the pose within a predetermined portion of a field of view of the camera;
generate image data representing a second two-dimensional representation of the object corresponding to the first two-dimensional representation of the object; and
determine one or more calibration parameters based at least on the first two-dimensional representation of the object and on the second two-dimensional representation of the object.

9. The system of claim 8, wherein the control circuitry is further configured to calculate a first relationship between the first two-dimensional representation of the object and the second two-dimensional representation of the object, wherein the determination of the one or more calibration parameters is based at least on the first relationship.

10. The system of claim 9, wherein the control circuitry is further configured to calculate a second relationship between the object in the virtual three-dimensional space and the first two-dimensional representation of the object, wherein the determination of the one or more calibration parameters is further based at least on the second relationship.

11. The system of claim 8, wherein the control circuitry is further configured to:
cause to be sensed, from the display screen, a third two-dimensional representation of the object;
generate second image data representing a fourth two-dimensional representation of the object corresponding to the third two-dimensional representation of the object; and
determine a reprojection error for the fourth two-dimensional representation of the object,
wherein the determination of the one or more calibration parameters is further based at least on the reprojection error.

12. The system of claim 8, wherein the predetermined portion of the field of view comprises a point positioned at a distance from the camera corresponding to a focal length of the camera.

13. The system of claim 8, wherein the predetermined portion of the field of view corresponds to a space occupied by an occupant of a vehicle in which the camera is positioned.

14. The system of claim 8, wherein the object comprises a patterned object.

15. A processor comprising:
processing circuitry to:
transform a three-dimensional representation of an object in a virtual three-dimensional space to orient the three-dimensional representation object in a particular pose with respect to a camera;
generate a two-dimensional representation of the object based at least on simulating the object having the particular pose within a predetermined portion of a field of view of the camera;
cause display of the two-dimensional representation of the object on a display;
generate image data representative of an image depicting the two-dimensional representation of the object sensed using at least one sensor of the camera;
determine a relationship between the two-dimensional representation of the object displayed on the display and the two-dimensional representation of the object as depicted by the image; and
determine one or more calibration parameters of the camera based at least on the relationship.

16. The processor of claim 15, further comprising processing circuitry to calculate a second relationship between the object in three-dimensional space and the two-dimensional representation of the object displayed on the display, wherein the determination of the one or more calibration parameters is further based at least on the second relationship.

17. The processor of claim 15, further comprising processing circuitry to sample poses of the object to determine an orientation of the object, the poses including the particular pose.

18. The method of claim 1, wherein the determining the relationship between the first two-dimensional representation of the object displayed on the display screen and the second two-dimensional representation of the object as depicted by the image comprises:
   determining that one or more first points associated with the first two-dimensional representation of the object displayed on the display screen correspond to one or more second points associated with the second two-dimensional representation of the object as depicted by the image; and
   determining the relationship based at least on the one or more first points and the one or more second points.

19. The processor of claim 15, wherein the determination of the relationship between the two-dimensional representation of the object displayed on the display and the two-dimensional representation of the object as depicted by the image comprises:
   determining that one or more first points associated with the two-dimensional representation of the object displayed on the display correspond to one or more second points associated with the two-dimensional representation of the object as depicted by the image; and
   determining the relationship based at least on the one or more first points and the one or more second points.

20. The processor of claim 15, wherein the predetermined portion of the field of view of the camera comprises one or more of:
   a point positioned at a distance from the camera corresponding to a focal length of the camera; or
   a space occupied by an occupant of a vehicle in which the camera is positioned.

* * * * *